(12) United States Patent
Fabricatore

(10) Patent No.: US 9,003,978 B1
(45) Date of Patent: Apr. 14, 2015

(54) CARRIER FOR ELECTRONIC DEVICES

(76) Inventor: Brian K. Fabricatore, Bohemia, NY (US)

(*) Notice: Subject to any disclaimer, the term of this patent is extended or adjusted under 35 U.S.C. 154(b) by 75 days.

(21) Appl. No.: 13/199,346

(22) Filed: Aug. 26, 2011

Related U.S. Application Data

(63) Continuation-in-part of application No. 29/370,818, filed on Sep. 9, 2010, now Pat. No. Des. 633,728.

(51) Int. Cl.
*A47B 23/00* (2006.01)
*A45C 11/00* (2006.01)

(52) U.S. Cl.
CPC ........................................ *A45C 11/00* (2013.01)

(58) Field of Classification Search
USPC ........... 248/346.2; 108/43; 5/655.4, 702, 911, 5/644, 654
See application file for complete search history.

(56) References Cited

U.S. PATENT DOCUMENTS

| | | | | |
|---|---|---|---|---|
| 4,052,944 A * | 10/1977 | Jennings | ......................... | 108/43 |
| 5,623,869 A * | 4/1997 | Moss et al. | ..................... | 108/43 |
| 5,732,849 A * | 3/1998 | Brooks | ......................... | 220/603 |
| 6,050,200 A * | 4/2000 | Sullins et al. | .................... | 108/43 |
| 8,657,248 B2 * | 2/2014 | Rowzee et al. | ............... | 248/444 |

* cited by examiner

*Primary Examiner* — Alfred J Wujciak
(74) *Attorney, Agent, or Firm* — Snell & Wilmer L.L.P.

(57) ABSTRACT

The present invention relates to a carrier that is configured to hold an electronic device and that comprises a malleable container disposed on a bottom portion of the container for elevating the electronic device in an upright position for better viewing of the electronic device by a user.

11 Claims, 2 Drawing Sheets

CARRIER FOR ELECTRONIC DEVICES

RELATED APPLICATION

This application is a Continuation-in-Part of design application No. 29/370,818 filed Sep. 9, 2010, now Design Pat. No. D633,728.

FIELD OF THE INVENTION

The present invention relates to a carrier for electronic devices such as cell phones, I-Pads, and the like which can be easily positioned on many surfaces to be upright for easier viewing and/or handling.

BACKGROUND OF THE INVENTION

Electronic devices such as computers, I-Pads and the like are usually hand held but at times are required to be hands-free in order to record. For easier hands-free viewing the devices are preferable in an upright position. Prior art devices used a metallic stand for use on a smooth surface to hold the device upright but had limitations on irregular surfaces.

SUMMARY OF THE INVENTION

The invention relates to a carrier for electronic devices comprising a holding means for electronic devices, a top portion and having attached along the bottom portion a malleable means comprising a film or fabric container having a deformable non-liquid material which can be shaped to elevate the electronic device.

Advantageously, the deformable material is sand, clay, beads, grain, a deformable plastic, or the like.

It is therefore an object of the invention to provide a carrier for an electronic device which can hold the device in an elevated position.

It is another object of the invention to provide a carrier for electronic devices which is adjustable as to the width and/or the length of the device.

The objects and advantages of the present invention will be better understood by a reading of the preferred embodiments of the invention and the drawings.

DESCRIPTION OF THE PREFERRED EMBODIMENTS

Figure 1:
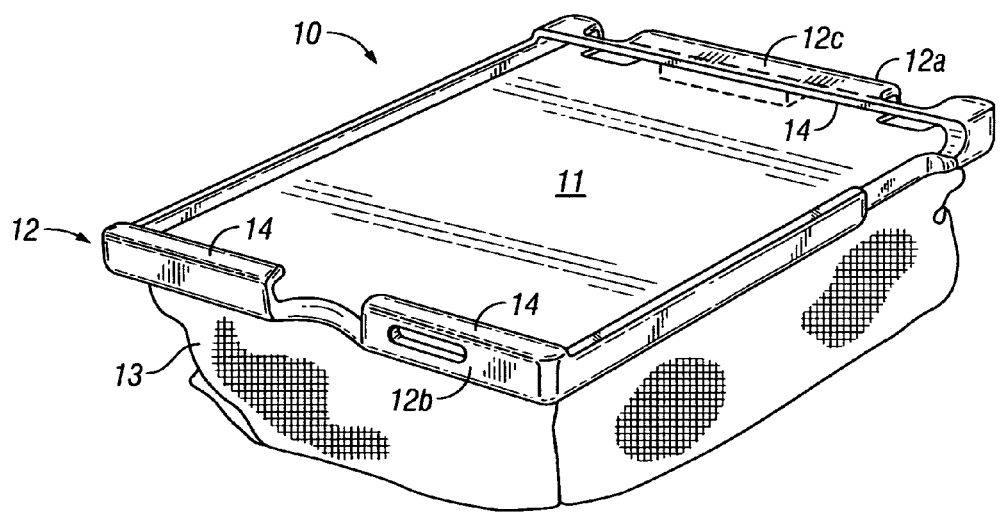
FIG. 1 is a perspective view of the carrier of the invention having attached along its bottom portion a malleable container.
Figure 2:
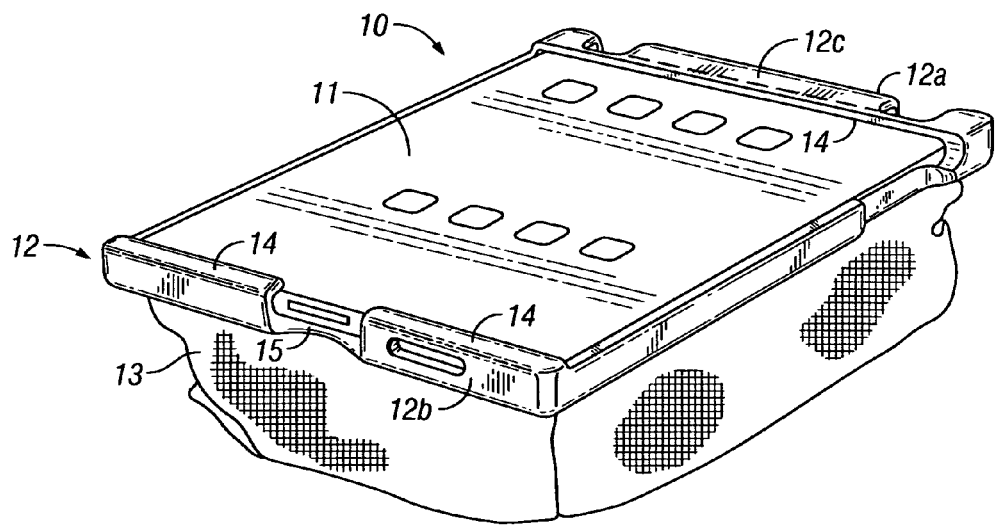
FIG. 2 is the carrier of FIG. 1 with an I-PAD held by the carrier.

As shown in FIGS. 1 and 2, the carrier (10) comprises a holding means (11) having attached to the bottom a malleable container (13) which holds a deformable non-liquid material. The deformable material can be sand, clay, beads, grain or plastic. A deformable material such as SILLY PUTTY® can be shaped with the container so that the I-PAD (11) or other electronic device can be elevated with proper shaping for easier hands-free viewing on any surface.

The malleable container (13) can comprise a textile, plastic film, canvas or the like. The container (13) can be attached to the holding means (12) with an adhesive, rivets or any known means. Alternatively, the container (13) can be detachable for easy packing.

The holding means (12) has a long its edges a lip or overhang (14) which keeps the electronic device (11) in place.

In the overhang or lip (14) is a resilient means (12c) such as a foam strip or spring means which is depressed so the I-PAD (11) fits into the bed (11) and holds it in place. To remove the I-PAD (11) the resilient means is depressed by the I-PAD (11) and it is free to remove.

A gap (15) at the bottom portion (12b) enables one to press the I-PAD (11) toward the top portion (12a) to release the I-PAD.

Figure 3:
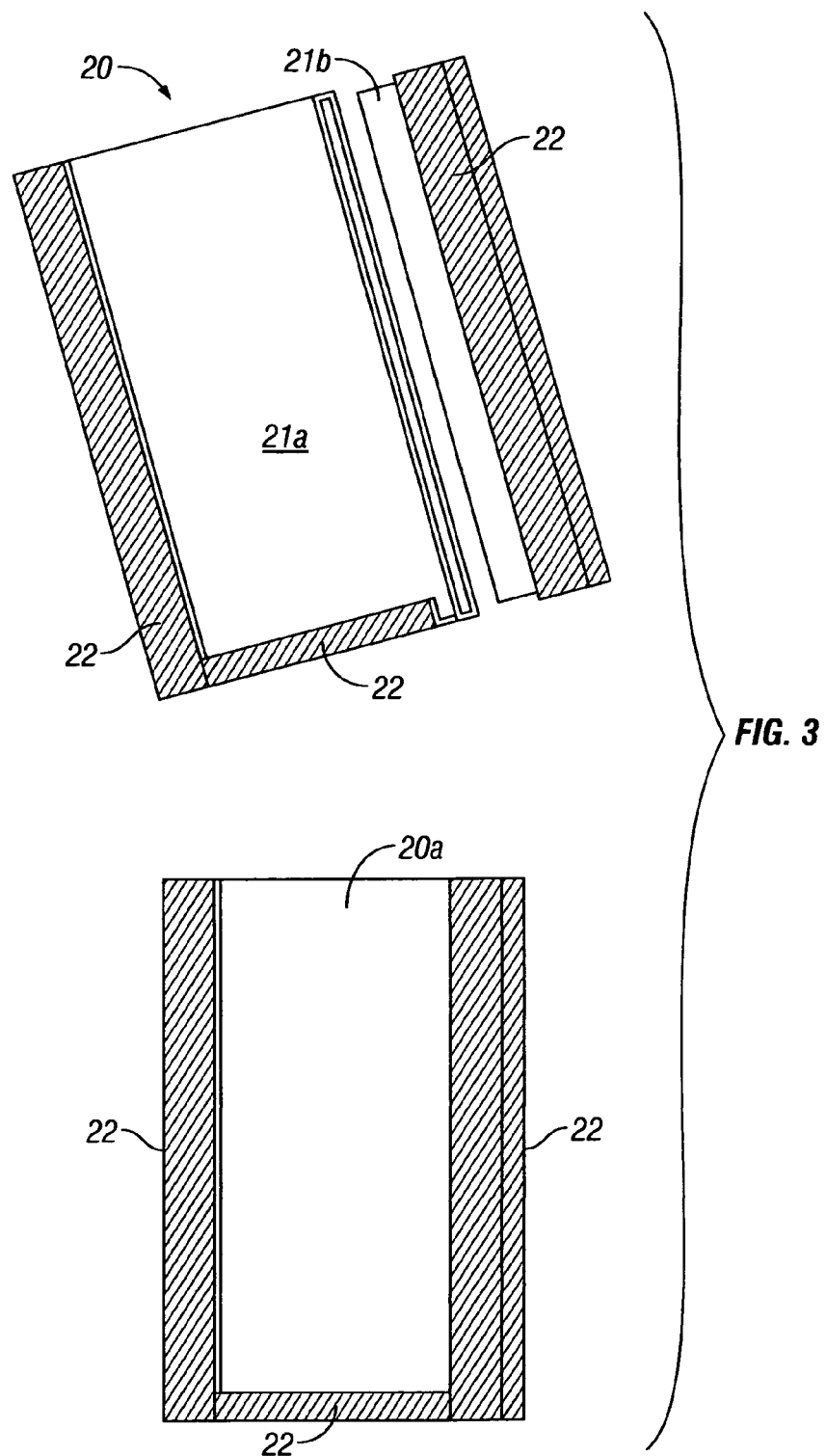
FIG. 3 is a form of a holding means having a part which slides into another part to accommodate various widths of I-PADS.

As shown in FIG. 3, the holding means (20) comprises part 21a and 21b. Part 21b slides into part 21a whereby the holding means (20) is adjustable to accommodate various widths of the different electronic devices. Not shown is the means for holding the parts together which may be in the form of a latch, hinge, elastic member, or the like.

The malleable container (not shown) is attached to the bottom of part 21a.

The parts 21a, 21b have lips or overhangs (22) with resilient means therein to grip the electronic device when placed within the carrier (10).

It is understood that although a square or rectangular form of holding means is disclosed, the holding means can be formed in a configuration to hold an electronic device having a different form.

It is also an embodiment of the invention that an electronic device have attached to its backside the malleable container with the deformable material for hands-free viewing.

Although an I-PAD has been shown, it is illustrative of other electronic devices including SMARTPHONE, computer, hand held telephone, or the like.

The carrier can be either metallic or plastic.

What is claimed is:

1. A carrier for electronic devices comprising:
   a holding means for holding an electronic device on a top surface of the carrier, the electronic device being disposed in the holding means on the top surface and comprising a comprising a visual display, wherein the holding means is positioned along a perimeter edge of the top surface and is rectangular in shape, the holding means including preformed wall elements that project upwardly from the perimeter edge and a distance away from the top surface, wherein two of the wall elements positioned at opposite locations of the perimeter edge each comprise a preformed lip that projects outwardly away from the respective wall elements towards one other and parallel to the top surface, the lips forming a space with the top surface for accommodating placement of respective opposed edge portions of the electronic device therein, wherein one of the lips includes a resilient means disposed within the respective space for holding the respective edge of the electronic device therein, and wherein the other one of the lip includes an open gap through the respective wall element for directly accessing an edge of the electronic device for moving the electronic device outwardly away from the open gap and respective lip and removing the electronic device from the holding means; and
   a malleable container disposed along a bottom surface of the carrier, the malleable container comprising a deformable non-liquid material disposed therein, wherein the malleable container is shape adjusting to place the carrier and the electronic device in an upright position from an underlying surface for viewing.

2. The carrier of claim 1 wherein the deformable non-liquid material is a member selected from the group consisting of sand, clay, beads, grain and plastic.

3. The carrier of claim 1 wherein the deformable non-liquid material is plastic beads.

4. The carrier of claim 1 wherein the malleable container is a member selected from the group consisting of plastic, textile and canvas.

5. The carrier of claim 1 wherein the holding means is adjustable as to the width of the electronic device.

6. The carrier of claim 1 wherein the holding means is adjustable as to length of the electronic device.

7. The carrier of claim 1 wherein the holding means is adjustable as to width and length of the electronic device.

8. An electronic device having a visual display and that is held within a carrier for permitting hand free viewing of the electronic device in an upright position, the carrier comprising holding means for securing the electronic device onto a top surface of the carrier such that the visual display is parallel with the top surface, the holding means comprising preformed wall elements that extend upwardly from and that are positioned along a perimeter edge of the top surface, the wall elements forming a rectangular shape, wherein two of the wall elements positioned opposite one another each comprise preformed lips that extend away from the respective wall elements towards one another and parallel with the top surface so as to each define a respective space between the lip and top surface for accommodating placement of a portion of the electronic device therein for secure attachment within the carrier, wherein one of the lips comprises a resilient means disposed therein for holding a portion of the electronic device therein, and wherein the other one of the lips comprises an open gap through the respective wall element for directly accessing the electronic device positioned within the respective space for moving the electronic device away from the space to permit removing the electronic device from the carrier, the carrier further comprising a malleable container that is disposed along a bottom surface of the carrier and that comprises a deformable non-liquid material disposed therein, wherein the malleable container is shape adjusting to place the carrier and the electronic device in an elevated upright position relative to an underlying surface for hand-free viewing of the electronic device.

9. The carrier as recited in claim 1 wherein the amount of the upright position of the carrier is defined by the extent to which the malleable container is deformed by shifting the deformable non-liquid material from one edge of the carrier, to reduce a distance between the one edge to an underlying surface, to an opposite edge of the carrier, to increase a distance between the opposite edge to an underlying surface.

10. The carrier as recited in claim 8 wherein the degree of the upright position of the carrier relative to the underlying surface is defined by the extent to which the malleable container is deformed by shifting the deformable non-liquid material from one edge of the carrier, to reduce a distance between the one edge to the underlying surface, to an opposite edge of the carrier, to increase a distance between the opposite edge to the underlying surface.

11. A carrier for accommodating removable attachment of an electronic device therewith, the electronic device comprising a bottom surface and a visual display that is oriented parallel with and directed in a direction opposite the bottom surface, the carrier comprising:
holding means comprising a planar top surface and wall elements that project upwardly a distance away from a peripheral edge of the top surface, wherein a pair of the wall elements that are opposite one another each comprise lips that extend towards one another and that are parallel with the top surface to form respective spaces to accommodate opposed edges of the electronic device, wherein one of the spaces comprises a resilient means disposed therein to hold the electronic device, and wherein the other of the spaces comprises an open gap through the respective wall element to permit access to the electronic device for moving it out of the respective space and away from the carrier; and
a malleable container attached to a bottom surface of the carrier and that comprises a deformable non-liquid material disposed therein, wherein the malleable container is shape adjusting to place the carrier and the electronic device in an elevated upright position relative to an underlying surface for hand-free viewing of the electronic device.

* * * * *